(12) United States Patent
Chen

(10) Patent No.: US 7,380,945 B2
(45) Date of Patent: Jun. 3, 2008

(54) COLOR MICRO-MIRROR PROJECTORS

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 389 days.

(21) Appl. No.: 11/283,295

(22) Filed: Nov. 18, 2005

(65) Prior Publication Data

US 2006/0126024 A1    Jun. 15, 2006

(30) Foreign Application Priority Data

Dec. 10, 2004    (TW) .............................. 93138281 A

(51) Int. Cl.
*G03B 21/14* (2006.01)
*H04N 5/74* (2006.01)

(52) U.S. Cl. .......................... 353/20; 353/94; 348/771

(58) Field of Classification Search ................ 353/94, 353/97, 122, 98, 84, 20, 32, 69; 348/771
See application file for complete search history.

(56) References Cited

U.S. PATENT DOCUMENTS 6,469,821 B2 * 10/2002 Bartlett et al. .............. 359/292
6,514,576 B1 * 2/2003 Kintaka et al. ............. 427/555
7,185,990 B2 * 3/2007 Koga et al. ................... 353/97
2007/0126992 A1 * 6/2007 Penn ........................... 353/84

* cited by examiner

*Primary Examiner*—Andrew T Sever
(74) *Attorney, Agent, or Firm*—Jeffrey T. Knapp

(57) ABSTRACT

A micro-mirror projector (2) includes a light source (100), a converging member (200), a color wheel (300) having red, green and blue segments, a shaping member (400), a micro-mirror chip (500) having a plurality of micro-mirror members (540) formed thereon, a diffraction member (600), and a projection member (700). The converging member converges a light beam emitted from the light source to the color wheel. The color wheel rotates across the converged light beam to generate red, green and blue lights. The shaping member shapes the red, green and blue lights as parallel lights and transmits the parallel light to a corresponding micro-mirror member. The micro-mirror member transmits the parallel lights to the diffraction member. The diffraction member diffracts the received lights to the projection member. The diffracted light is relatively fine/highly resolved, thereby resulting in a better display on a projection screen (800) via the projection member.

11 Claims, 2 Drawing Sheets

COLOR MICRO-MIRROR PROJECTORS

BACKGROUND

1. Field of the Invention

The present invention relates generally to color display devices and, more particularly, to a color micro-mirror projector.

2. Discussion of Related Art

Micro-mirror projectors are also called digital light processing (DLP) projection devices. Micro-mirror projectors have been developed by Texas Instruments, and a typical micro-mirror projector adopts digital micro-mirror devices (DMDs) to control light beams to enter the display light path. A typical DMD includes a plurality of supporting posts, a plurality of torsion hinges, and a plurality of micro-mirrors formed on a semiconductor substrate thereof. The semiconductor substrate can be, e.g., a silicon substrate. Each torsion hinge is positioned between two adjacent supporting posts, and each micro-mirror is installed on a given torsion hinge. When controlling signals are input to the DMD, the micro-mirrors would rotate around the corresponding torsion hinges.

Referring to FIG. 3, a conventional micro-mirror projector 1 includes a light source 10, a converging lens 20, a color wheel 30, a shaping lens 40, a micro-mirror chip 50 and a projection member 70. The color wheel 30 has at least red, green and blue segments. The micro-mirror chip 50 has a plurality of digital micro-mirror members 51 and a processor 52 formed thereon. Each micro-mirror member 51 has a plurality of micro-mirror (not shown) formed thereon. The light source 10 is used to emit a light beam. The converging lens 20 is used to converge the light beam to the color wheel 30. The color wheel 30 is disc-shaped and rapidly rotates across the converged light beam to generate red, green and blue lights. The shaping lens 40 is used to shape the red, green and blue lights as parallel lights and transmit the parallel lights to a corresponding micro-mirror member 51 of the micro-mirror chip 50. The micro-mirror member 51 receives a controlling signal from the processor 52. Upon receipt of an appropriate signal, the micro-mirrors thereon rapidly rotate and respectively transmit the corresponding parallel lights to the projection member 70, at a given/selected time. The projection member 70 is used to transmit the received lights onto a projection screen 80. Therefore, an image is displayed on the projection screen 80.

However, each pixel on the projection screen 80 is in accordance with the corresponding micro-mirror. When the projection screen 80 is relatively big, energy loss of the lights transmitted onto the projection screen 80 is relatively large. Therefore, divisions between adjacent pixels are relatively clear (i.e., well-defined). This results in the image being unsatisfactory.

What is needed, therefore, is a micro-mirror projector that can provide better images on the projection screen.

SUMMARY

In one embodiment, a micro-mirror projector includes a light source, a converging member, a color wheel, a shaping member, a micro-mirror chip, a diffraction member and a projection member. The color wheel has at least red, green and blue segments. The micro-mirror chip has a plurality of digital micro-mirror members and a processor formed thereon. Each micro-mirror member has a plurality of micro-mirrors formed thereon. The light source is used to emit a light beam. The converging member is used to converge the light beam to the color wheel. The color wheel rapidly rotates across the converged light beam to generate red, green and blue lights. The shaping member is used to shape the red, green and blue lights as parallel lights and transmit the parallel lights to a corresponding micro-mirror member of the micro-mirror chip. The micro-mirror member receives a controlling signal from the processor. Upon being signaled to do so, the micro-mirrors thereon rapidly rotate and respectively transmit the corresponding parallel lights to the diffraction member at a given/selected time. The diffraction member is used to diffract the received lights to the projection member. The projection member is used to transmit the diffracted lights onto a projection screen. The diffracted lights are relatively fine, thereby generating a better display on the projection screen.

Compared with a conventional micro-mirror projector, the light transmitted to the projection member of the present micro-mirror projector is relatively fine (i.e., highly resolved) due to the diffracting effect of the diffraction member. That is to say, energy loss of the light is relatively little. Therefore, divisions between adjacent pixels are relatively dim (i.e., not highly pronounced; essentially indistinct). Thus, images displayed on the projection screen are better (i.e., with respect to the brightness, chroma/vividness, and/or uniformity thereof).

Other advantages and novel features will become more apparent from the following detailed description of preferred embodiments when taken in conjunction with the accompanying drawings.

BRIEF DESCRIPTION OF THE DRAWINGS

Many aspects of the present micro-mirror projector can be better understood with reference to the following drawings. The components in the drawings are not necessarily to scale, the emphasis instead being placed upon clearly illustrating the principles of the present micro-mirror projector. Moreover, in the drawings, like reference numerals designate corresponding parts throughout the several views.

Figure 1:
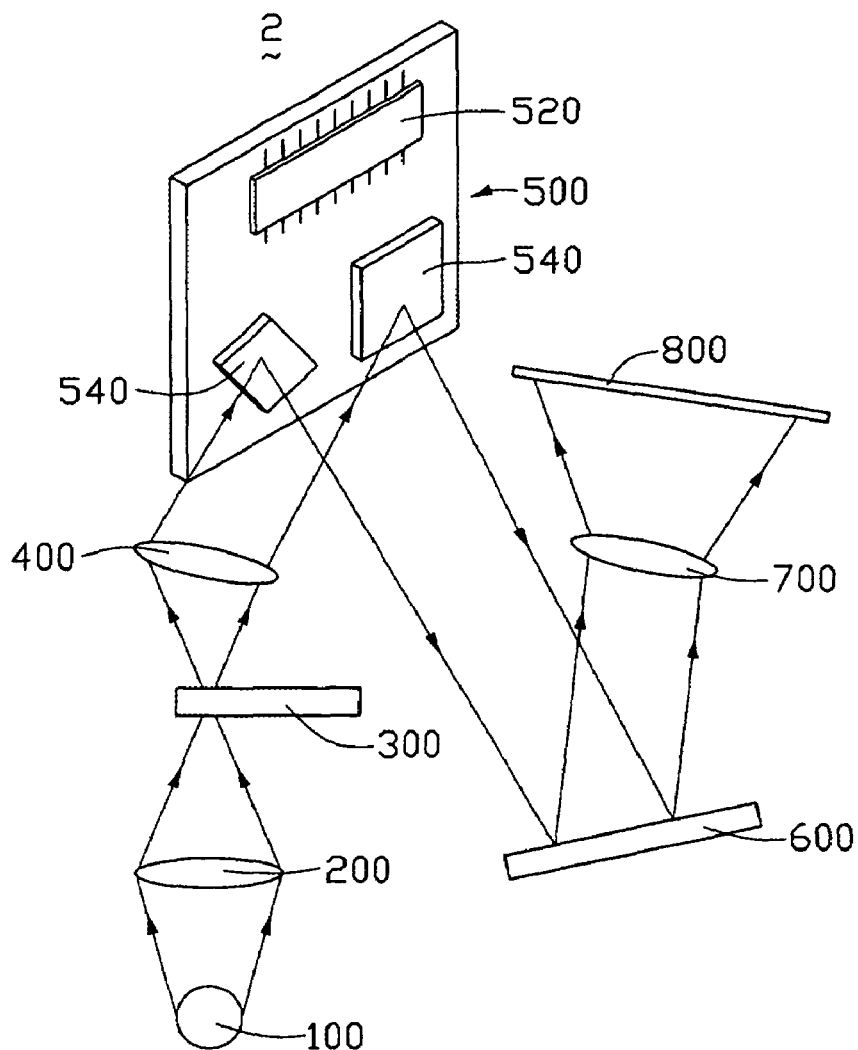
FIG. 1 is a schematic view of a micro-mirror projector, in accordance with a preferred embodiment of the present device.

Corresponding reference characters indicate corresponding parts throughout the several views. The exemplifications set out herein illustrate at least one preferred embodiment of the present micro-mirror projector, in one form, and such exemplifications are not to be construed as limiting the scope of the present micro-mirror projector in any manner.

DETAILED DESCRIPTION OF PREFERRED EMBODIMENTS

Reference will now be made to the drawings to describe embodiments of the present micro-mirror projector in detail.

Referring to FIG. 1, a micro-mirror projector 2, in accordance with a preferred embodiment of the present device, includes a light source 100, a converging member 200, a color wheel 300, a shaping member 400, a micro-mirror chip 500, a diffraction member 600 and a projection member 700. The color wheel 300 includes at least three color segments. In the preferred embodiment, the color wheel 300 includes red, green and blue segments. The micro-mirror chip 500 has a plurality of micro-mirror members 540 and a processor 520 formed thereon. Each micro-mirror member 540 has a plurality of micro-mirrors (not shown) formed thereon. The processor 520 is used to control the rotation of the micro-mirrors. In the preferred embodiment, the converging member 200 is a converging lens, the shaping member 400 is a shaping lens, and the diffraction member 600 is a diffraction grating. The diffraction grating is advantageously made of at least one of aluminum and an aluminum alloy.

Figure 2:
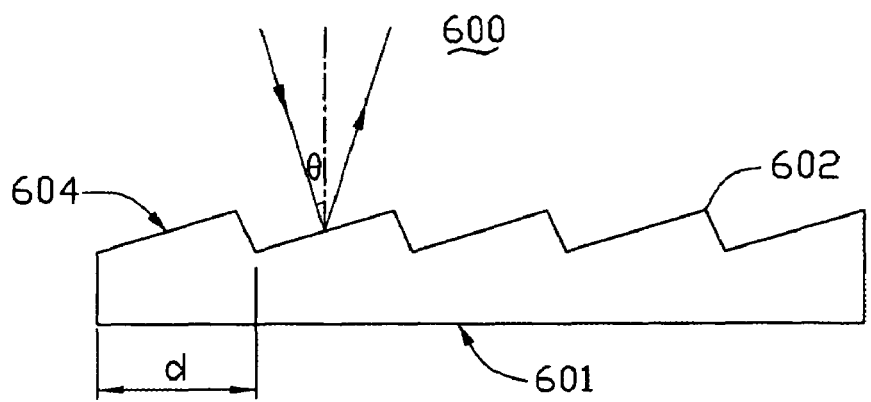
FIG. 2 is a schematic, enlarged view of a diffraction member of the micro-mirror projector of FIG. 1, showing a light being transmitted thereto and being diffracted therefrom.
Figure 3:
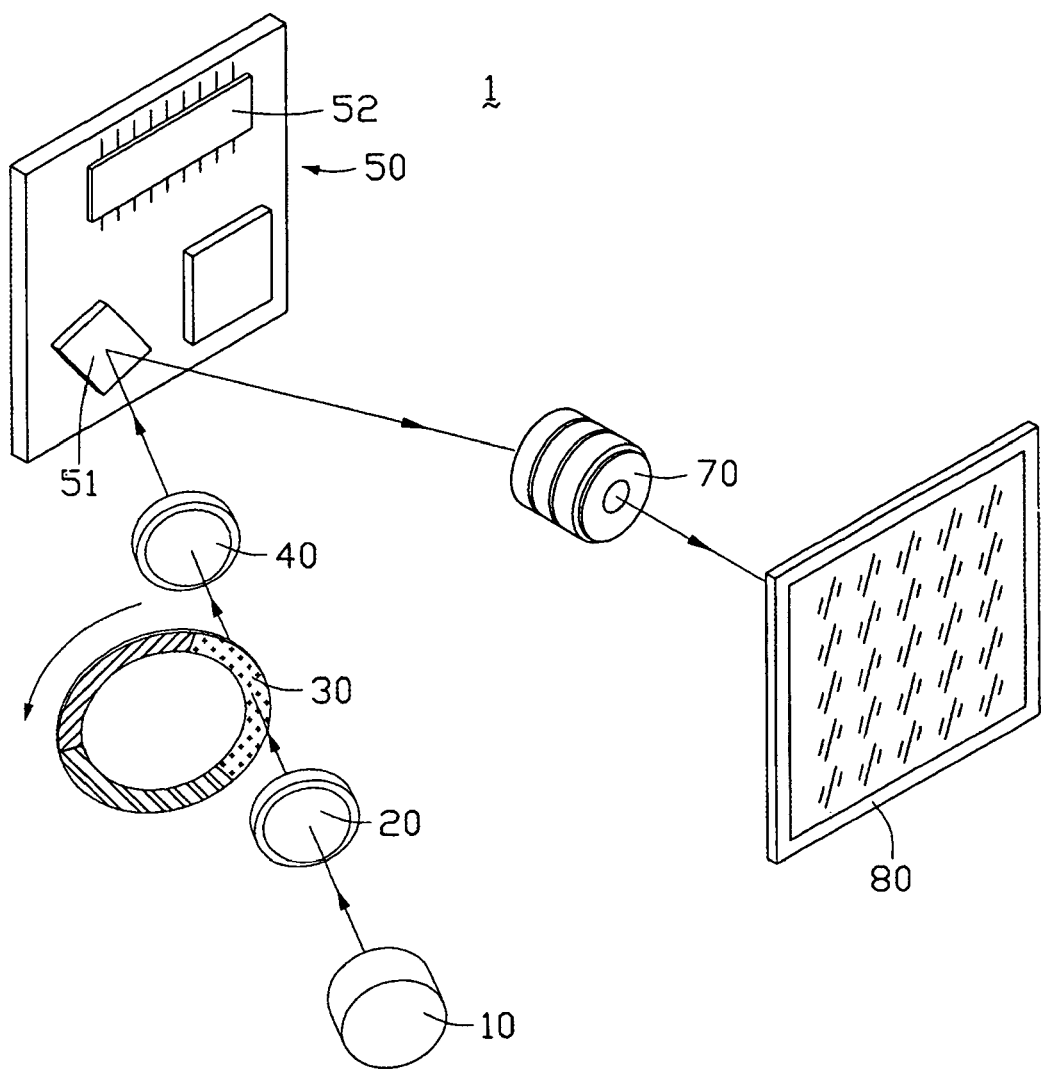
FIG. 3 is an isometric view of a conventional micro-mirror projector.

FIG. 2 is a schematic, enlarged view of the diffraction grating 600 in FIG. 1. The diffraction grating 600 has a plurality of micro-structures 602 formed on a top surface thereof, and a bottom surface 601 thereof is substantially a flat surface. In the preferred embodiment, each micro-structure 602 is a step. Each step 602 has a step surface 604. A grating constant of the diffraction grating 600 is a length d of each step 602.

Referring to FIG. 1, in use, a light beam is emitted from the light source 100. Then the light beam is converged to the color wheel 300 by the converging lens 200. The color wheel 300 rapidly rotates across the converged light beam, thereby generating red, green and blue lights. After that, the red, green and blue lights are shaped as parallel lights by the shaping lens 400 and are transmitted to a corresponding micro-mirror member 540 of the micro-mirror chip 500. The micro-mirror member 540 receives a controlling signal from the processor 520. Based on receipt of the controlling signal, the micro-mirrors on the micro-mirror chip 500 rapidly rotate and respectively transmit the corresponding parallel lights to the diffraction grating 600 at a given/selected time.

Referring to FIG. 2, the parallel lights with a wavelength $\lambda$ are transmitted on the step surface 604 of one step 602 of the diffraction grating 600. The parallel lights are substantially perpendicular to the step surface 604. An angle between the parallel lights and a normal which is perpendicular to the bottom surface 601 is labeled as $\theta$. The angle $\theta$ is named as a blazing angle. When $2d*\sin\theta$ is equal to $m\lambda$ ($2d*\sin\theta=m\lambda$), the parallel lights would be diffracted from the step surface 604. In the above-described equation, m is an integer and is bigger than zero.

Referring to FIG. 1, the diffracted lights are transmitted through the projection lens 700 and then transmitted onto a projection screen 800 to produce an image thereon.

Compared with a conventional micro-mirror projector, the lights transmitted to the projection member 700 of the present micro-mirror projector 2 are relatively fine (i.e., highly resolved) due to the diffracting effect of the diffraction lens 600. That is to say, energy loss of the light is relatively little. Therefore, divisions between adjacent pixels are relatively dim/indistinct. Thus, images (i.e., with respect to the brightness, chroma/vividness, and/or uniformity thereof) displayed on the projection screen 800 are better.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

We claim:

1. A projection device comprising:
   at least one light source used to emit a light beam;
   at least one converging member used to converge the light beam;
   at least one color wheel having at least three color segments, each color wheel being configured for rotating across the converged light beam to generate at least three kinds of color lights;
   at least one shaping member used to shape the color lights as parallel lights;
   at least one diffraction member;
   at least one projection member; and
   at least one micro-mirror chip having a plurality of micro-mirror members formed thereon, at least one micro-mirror member being configured for transmitting the parallel lights to the diffraction member, and the diffraction member being configured for diffracting the received lights to the projection member.

2. The projection device as claimed in claim 1, wherein the three color segments are red, green, and blue segments, respectively.

3. The projection device as claimed in claim 2, wherein the three kinds of color lights are red, green and blue lights, respectively.

4. The projection device as claimed in claim 1, wherein the diffraction member is a diffraction grating.

5. The projection device as claimed in claim 4, wherein the diffraction grating is made of at least one of aluminum and an aluminum alloy.

6. The projection device as claimed in claim 4, wherein the diffraction grating has a plurality of micro-structures formed on a top surface thereof.

7. The projection device as claimed in claim 6, wherein each micro-structure is a step.

8. The projection device as claimed in claim 7, wherein the step has a step surface, the parallel light being substantially perpendicular to the step surface.

9. The projection device as claimed in claim 1, wherein the converging member is a converging lens.

10. The projection device as claimed in claim 1, wherein the shaping member is a shaping lens.

11. The projection device as claimed in claim 1, wherein the micro-mirror chip further comprises a processor to control the rotation of the micro-mirror members.

* * * * *